Feb. 22, 1966    MOTOAKI YOKOI ETAL    3,236,213
ROTARY TYPE COMPOUND INTERNAL COMBUSTION ENGINES
Filed June 5, 1962    7 Sheets-Sheet 1

Inventors
Motoaki Yokoi
Yoshitsugu Hamada
By Stevens, Davis, Miller & Mosher
Attorneys Feb. 22, 1966 MOTOAKI YOKOI ETAL 3,236,213
ROTARY TYPE COMPOUND INTERNAL COMBUSTION ENGINES
Filed June 5, 1962 7 Sheets-Sheet 2

Inventors
Motoaki Yokoi
Yoshitsugu Hamada.
By Stevens, Davis, Miller & Mosher
Attorneys Feb. 22, 1966　　　MOTOAKI YOKOI ETAL　　　3,236,213
ROTARY TYPE COMPOUND INTERNAL COMBUSTION ENGINES
Filed June 5, 1962　　　　　　　　　　　　　　7 Sheets-Sheet 3

Inventors
Motoaki Yokoi
Yoshitsugu Hamada
By Stevens Davis Miller & Mosher
Attorneys United States Patent Office 3,236,213
Patented Feb. 22, 1966

1

3,236,213
ROTARY TYPE COMPOUND INTERNAL
COMBUSTION ENGINES
Motoaki Yokoi, Ashiya-shi, and Yoshitsugu Hamada,
Nishinomiya-shi, Japan, assignors to Yanmar Diesel
Engine Co., Ltd., Osaka, Japan, a corporation of Japan
Filed June 5, 1962, Ser. No. 200,171
Claims priority, application Japan, July 10, 1961,
36/24,037
4 Claims. (Cl. 123—8)

The present invention relates to rotary engines and particularly to rotary engines of the planetary revolution type.

Rotary engines of the type generally employ a generally polygonal rotor journaled in a housing having an inner wall of multilobe, and usually double-lobe, epitrochoidal configuration eccentrically with respect to the central axis of the housing, said rotor being rotatable with its edges slidably contacting said inner wall at all times during operation. With this type of engine, it is rather difficult to obtain a desirably high compression ratio because of the required clearances between the inner wall surface of the engine housing and the outer periphery of the rotor. These clearances result in a relatively large volume compression (working) chamber even at the maximum point of compression, as compared to reciprocating piston-type engines. This condition is progressively accentuated, the smaller the size of the rotary engine, thereby making it substantially impossible to successfully adapt a diesel cycle to small rotary engines. The present invention has for its object to attain with ease a high compression ratio as required in a diesel cycle and to effectively utilize the energy contained in the combustion gases.

To this end, according to the present invention, a pair of rotary engine units of the same type are juxtaposed, one of said rotary engine units acting as a compressor to feed compressed air to the other engine unit through its intake port, while the exhaust of the other engine unit is returned to the compressor unit to expand therein, thus allowing the compressor unit to serve as a second stage expanding machine for full utilization of the energy contained in the working fluid.

The present invention will now be described with reference to the accompanying drawings.

FIGS. 3 to 20, inclusive, illustrate a pair of rotors incorporated in the inventive engine and occupying respective operative positions.

Figure 1:
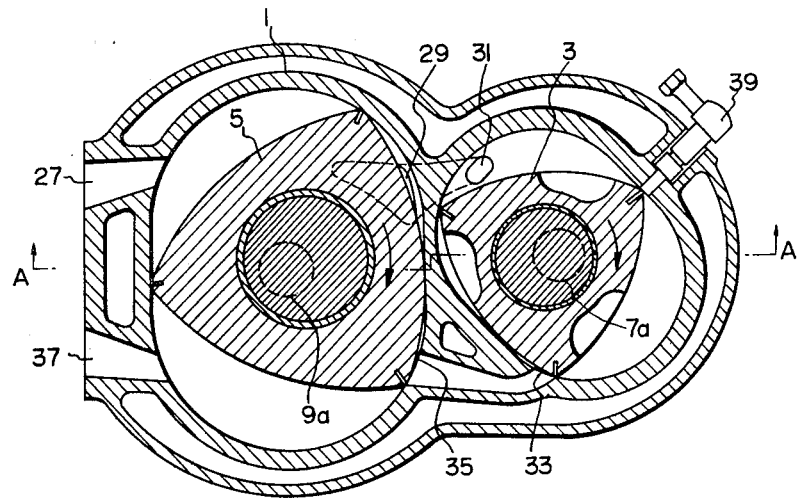
FIG. 1 is a cross section, taken along the line B—B in FIG. 2, of the inventive engine.
Figure 2:
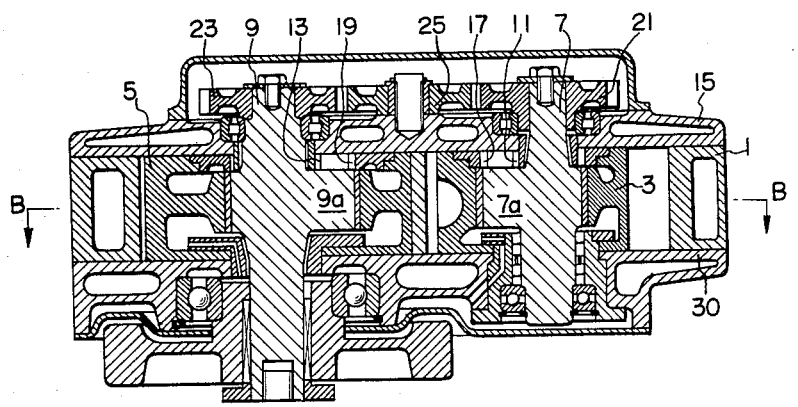
FIG. 2 is a cross section taken along the line A—A in FIG. 1.

Referring first to FIGS. 1 and 2, numeral 1 indicates an engine housing having two separate inner walls of approximate double-lobe epitrochoidal configuration with a pair of rotors 3 and 5 accommodated in the housing with their edges slidably contacting said respective inner walls. Centrally of the respective double-lobe epitrochoidal inner walls extend a pair of crank shafts 7 and 9 carrying respective crank pin portions 7a and 9a, on which said rotors 3 and 5 are rotatably mounted. Secured to the side cover 15 of the engine are gears 11 and 13 which are coaxial with the respective crank shafts 7 and 9 and in mesh with respective internal gears 17 and 19 stationarily secured to the respective rotors 3 and 5. The gear ratio between the gears 11 and 17 and that between 13 and 19 are both 2 to 3. Secured to one end of the respective crank shafts 7 and 9 are gears 21 and 23 having the same number of gear teeth and interconnected with each other through the intermediary of an intermediate gear 25. Accordingly, the crank shafts 7 and 9 are rotatable in the same direction at the same speed, and hence the two

2 rotors 3 and 5 are rotatable about their respective axis in the same direction as the crank shafts at one third the rotation speed of the latter.

Referring to FIG. 1, numeral 27 designates a suction port for fresh air; 29 a fresh air feed port formed in the side cover 30; 31 a fresh air charge port formed in the side cover and connected by a passage with said fresh air feed port; 33, a hot gas outlet port; 35, a hot gas inlet port connected by a passage with said hot gas outlet port 33; 37, a cold gas outlet port; and 39, a fuel injection valve. In the figure, the arrows indicate the direction of rotation of crank shafts 7 and 9 and hence the rotors 3 and 5.

It will be noted from FIGURE 1 that the major axis of the double-lobed chamber in which rotor 3 rotates, lies at angle of about 45 degrees with respect to the major axis of the chamber in which rotor 5 rotates. In other words, the two axes are not parallel to each other. The reason for this is to shorten the passage distance between feed port 29 and charge port 31, and the advantage deriving therefrom is that the amount of fresh air remaining in the passage between ports 29 and 31 is reduced to a minimum with a consequent higher charging efficiency and increased power output as compared to an arrangement wherein said passage is of longer length.

Description will now be made solely on the operating process of the apparatus according to the present invention with reference to FIGS. 3 to 20, inclusive. In these figures, the first-stage compressor or second-stage expander is shown on the left-hand portion while the second-stage compressor or first-stage expander is shown in the right-hand side portion. In the following, the former will be referred to as "second-stage expander" and the latter, as "first stage expander," for brevity's sake. The direction of rotation of the crank shafts and rotors is indicated by the arrows. For convenience's sake, description will be made primarily upon the basis of the operation of the working chamber $V_1$ of the first-stage expander.

Figure 3:
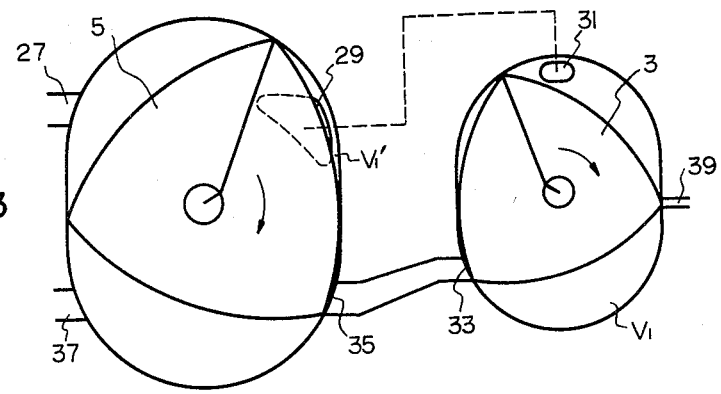
Figure 4:
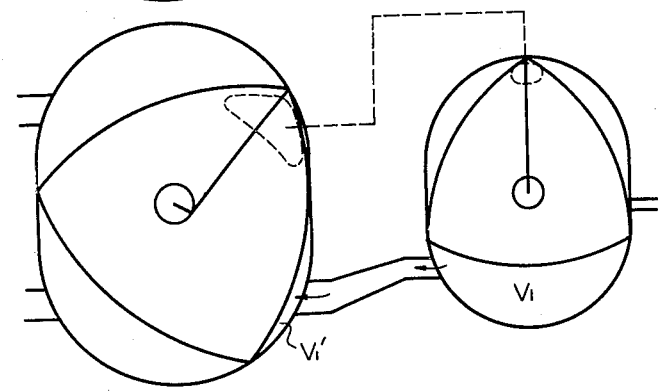
Figure 5:
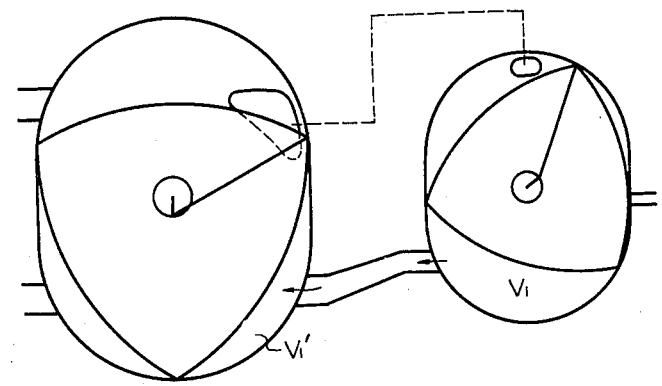
Figure 6:
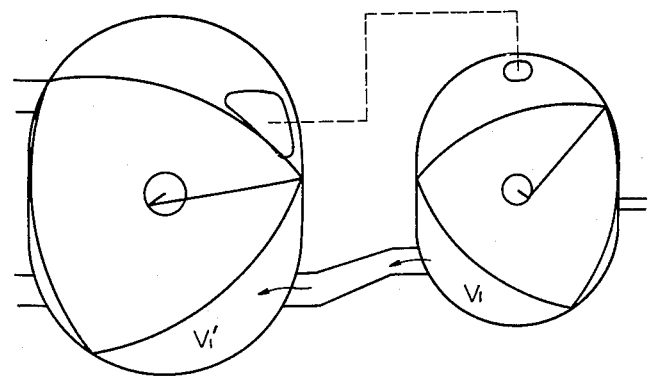
Figure 7:
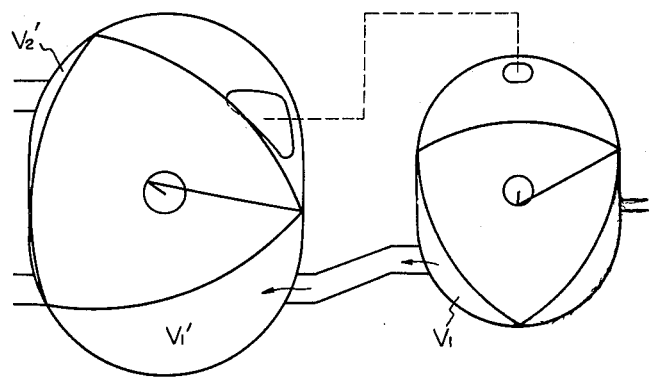
Figure 8:
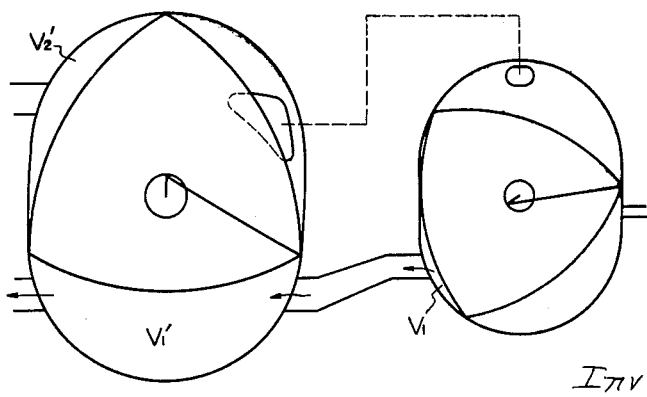
Figure 9:
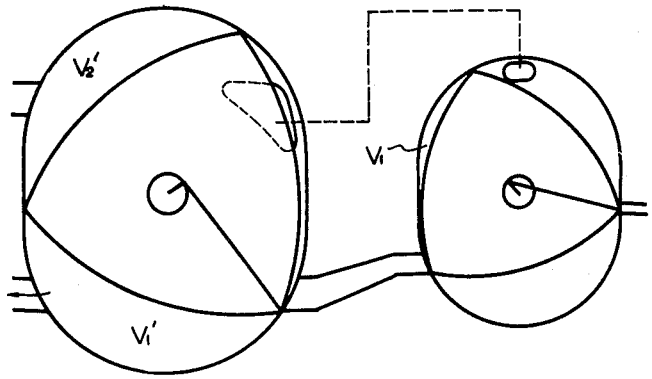

FIG. 3 corresponds to the instant when the hot gas outlet port 33 is just about to open at the end of the expansion stroke of the working chamber $V_1$ of the first-stage expander. At this instant, with the second-stage expander, the hot gas inlet port 35 has just opened to the working chamber $V_1$ alone.

FIGS. 4 to 7 disclose the process of the exhaust stroke in the working chamber $V_1$ of the first expander and that of the expansion stroke in the second expander. In this process, the hot exhaust gases from the first expander are effectively made use of in the second expander. FIGS. 8 to 12 illustrate the process of exhaust stroke in the working chamber $V_1'$ of the second expander. Meanwhile, by the time corresponding to the operative position shown in FIG. 9, the exhaust of hot gases from the working chamber $V_1$ of the first expander has been completed and thereafter the volume of the chamber $V_1$ again starts to increase.

Figure 10:
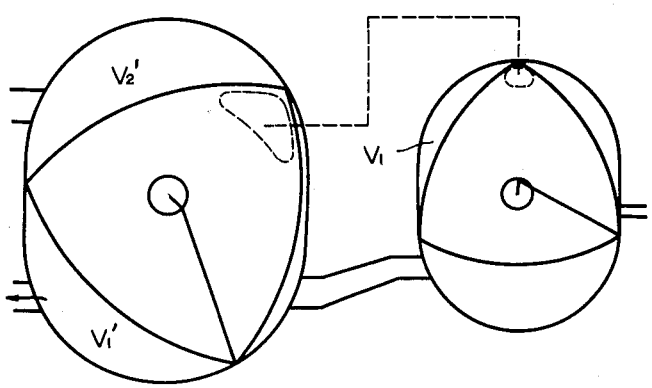

At the stage of FIG. 10, the working chamber $V_1$ of the first expander is increased in volume but is closed against any openings so that the pressure therein becomes negative relative to the atmospheric. At this stage, the first-stage expander must be effected a work rendered externally to cause the pressure of the chamber $V_1$ negative.

Figure 11:
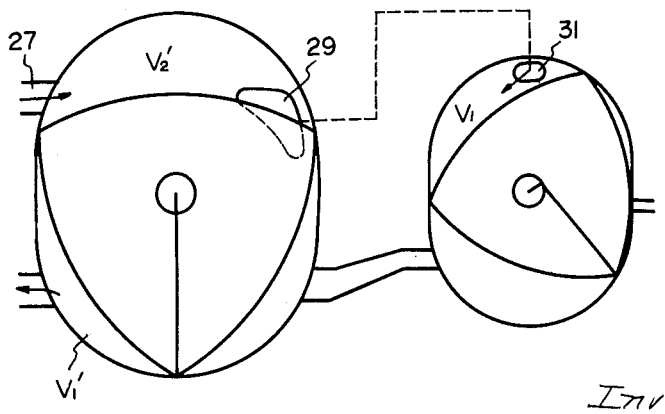

At the stage of FIG. 11, the fresh air charge port 31 opens to the working chamber $V_1$ of the first-stage expander. Meanwhile, the working chamber $V_2'$ of the second-stage expander in advance of the working chamber $V_1'$ thereof has been drawing in fresh air through the fresh air suction port 27 since FIG. 7, and, at the stage of FIG. 11, is in communication with the fresh air feed port 29 and hence with the working chamber $V_1$ of the first-stage expander, allowing the fresh air in the chamber $V_2'$ to flow into the chamber $V_1$. The fresh air under atmospheric pressure flows into the working chamber $V_1$ having a negative pressure as described above, and the pressure therein grows up to almost atmospheric pressure. In the meantime, the energy which is thus rendered externally in the working chamber $V_1$ and conserved as a negative pressure increases the internal energy of the fresh air flowing into the chamber $V_1$, so that the temperature of the air in said chamber rises to an extent corresponding to said energy. This is a very favorable situation particularly when the engine is started.

Figure 12:
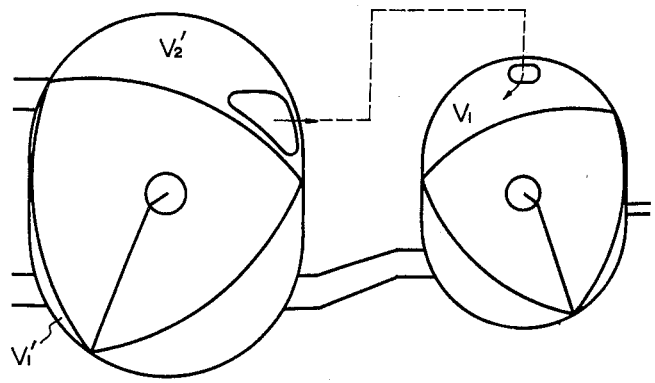
Figure 13:
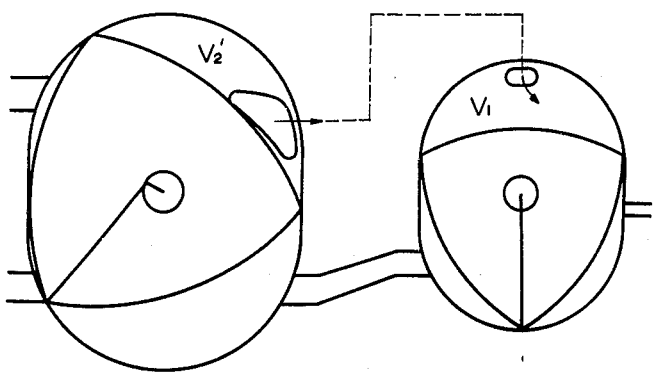
Figure 14:
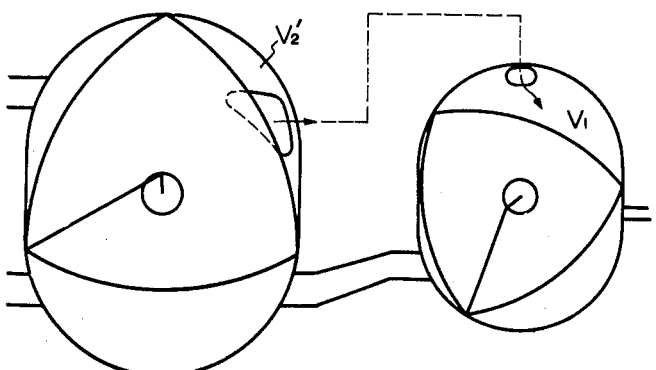
Figure 15:
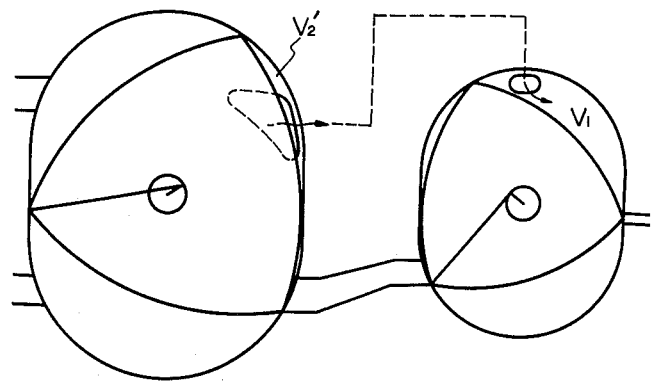

At the stage of FIG. 12, the working chamber $V_2'$ of the second-stage expander has completed its suction stroke and immediately started to supply the fresh air to the working chamber $V_1$ of the first-stage expander. This process continues until the stage of FIG. 15, and during this process the fresh air is compressed to some extent as so-called initial compression.

Figure 16:
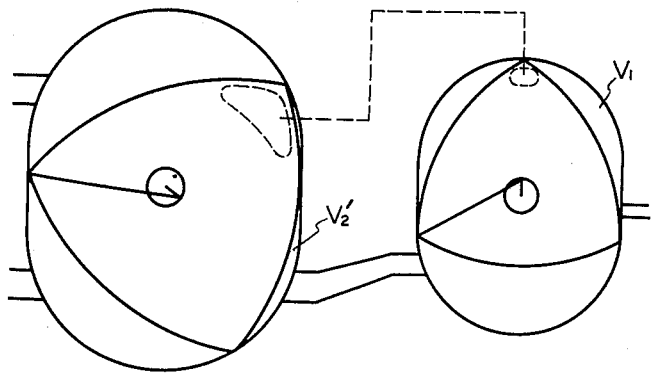

At FIG. 16, the supply of fresh air from the working chamber $V_2'$ of the second-stage expander to the working chamber $V_1$ of the first-stage expander has completed, the major portion of the fresh air fed in the chamber $V_2'$ being now in the chamber $V_1$.

Figure 17:
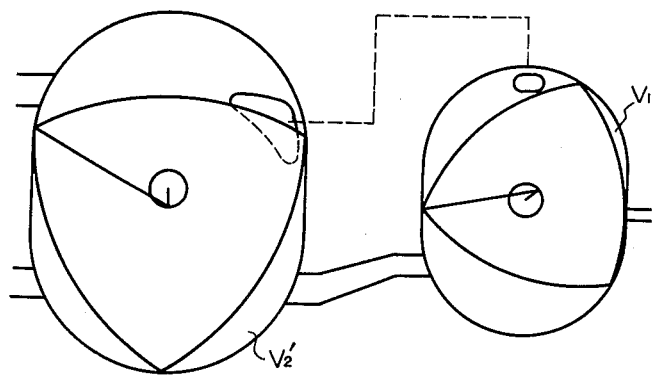

FIG. 17 shows the process of compression in the working chamber $V_1$ of the first-stage expander. In this relative position, fuel is injected into the working chamber of the first-stage expander and is ignited by the heat of the charge filled therein and compressed to the elevated temperature.

Figure 18:
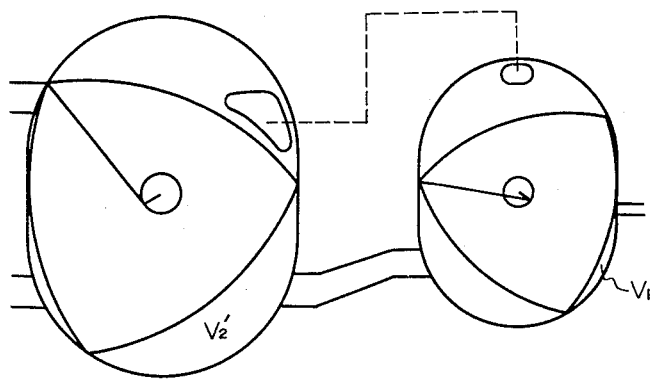
Figure 19:
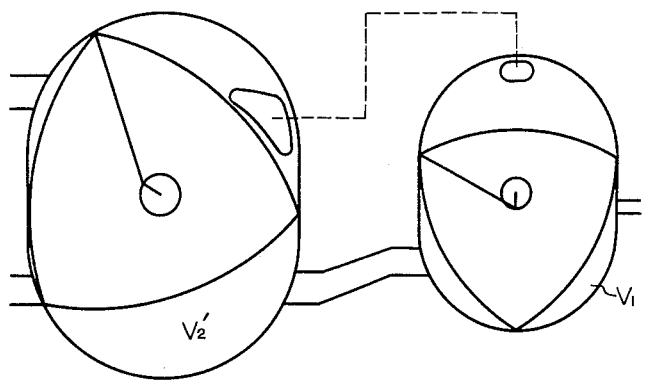
Figure 20:
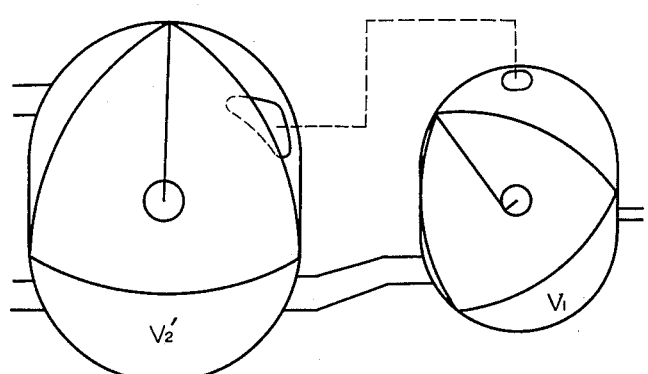

Thereafter, the process of expansion proceeds in the working chamber $V_1$ of the first-stage expander, as shown in FIGS. 18 to 20. With the engine arranged and constructed as described above, a compression ratio can be obtained which enables effective use of the diesel cycle with a rather small-sized engine, only if a proper ratio of the volumes of the respective working chambers of the first-stage and second-stage expanders is selected.

Further advantages of the present invention are as follows:

(1) For efficient feed of fresh air from the second-stage to the first-stage expander, the passage connecting the fresh air supply port with the fresh air feed port may be made short to reduce the passage volume.

(2) Blow-back of the fresh air, free escapement of the combustion gases, and other phenomena deleterious to the engine performance are completely eliminated noticeably improving the engine performance.

(3) As indicated, in the initial suction stroke of the first-stage expander, the pressure in the working chamber is temporarily reduced to below atmospheric causing a work energy to be stored therein, and by this energy, the temperature of the fresh air flowing into the chamber rises.

What is claimed is:

1. A rotary type compound internal combustion engine comprising a housing having two separate inner walls of double-lobe approximately epitrochoidal, configuration; crank shafts journaled in said housing, and two generally triangularly shaped rotors eccentrically mounted on said respective crank-shafts for rotation about their respective axes at a speed ratio of 1 to 3 with the edges of the rotors slidably contacting the respective inner walls of said housing, all of the above component members forming a first and a second rotary machine unit arranged on respective parallel longitudinal axes, said first unit acting as an internal combustion engine and the said second unit acting as a compressor, said crankshafts being arranged to rotate in the same direction at the same speed of rotation, said second unit having a suction port, a fresh air feed port, a hot gas inlet port, and a cold gas outlet; said first unit having a fresh air charge port communicating with said fresh air feed port through one passage and a hot gas outlet port communicating with said hot gas inlet port through another passage; the intake period in said first unit corresponding to a compression stroke in said second unit and the outlet period in said first unit corresponding to an expansion stroke in said second unit, the inner walls of each said first and second units defining respective double-lobe chambers having a dividing wall therebetween, each chamber having a major and a minor axis, the major axis of the first unit chamber being angularly positioned relative to the major axis of said second unit chamber whereby one end of said first unit major axis is relatively closely adjacent to said dividing wall and whereby the other end of said first unit major axis is relatively remote from said dividing wall, said fresh air charge port being located substantially at said one end of said first unit major axis on one side of said dividing wall and said fresh air feed port being located adjacent to the other side of said dividing wall.

2. A rotary type compound internal combustion engine including a first and a second rotary machine unit arranged on respective parallel longitudinal axes and comprised of a common housing having two separate inner peripheral walls of double-lobe approximately epitrochoidal, configuration, two crankshafts journaled in said housing, and generally triangularly shaped rotors eccentrically mounted on the respective shafts for rotation about their respective own axes at one-third the rotation speed of the crankshafts with the edges of the rotors slidably contacting the respective inner peripheral walls of said housing, said crankshafts being arranged so as to rotate in the same direction at the same speed of rotation, the first rotary machine unit acting as a proper internal combustion engine and the second rotary machine unit acting as a compressor, the second unit having a compressed air feed port in communication with a fresh air charge port of the first unit, the exhaust from the first unit being introduced into the working chamber of the second unit to expand therein for the purpose of recovering the energy of the exhaust gases, said crank shafts having respective crank pin portions offset at a phase angle relative to each other of 90 to 150 degrees with respect to the major axes of the approximately epitrochoidal inner peripheral walls of said housing, said separate inner walls defining respective first and second double-lobe chambers having a dividing wall therebetween, each chamber having a major and a minor axis, the major axis of said first chamber being angularly positioned relative to the major axis of said second chamber whereby one end of said first chamber major axis is relatively closely adjacent to said dividing wall and the other end of said chamber major axis is relatively remote from said dividing wall, said fresh air charge port being located substantially at said one end of said first chamber major axis on one side of said dividing wall and said fresh air feed port being located adjacent to the other side of said dividing wall in said second chamber.

3. A rotary type compound internal combustion engine including a first and a second rotary machine unit arranged on respective parallel longitudinal axes and comprised of a common housing having two separate inner peripheral walls of double-lobe approximately epitrochoidal, configuration, two cranks shafts journaled in said housing, generally triangularly shaped rotors eccentrically mounted on said respective crank shafts for rotation about their respective own axes at one-third the rotation speed of said crankshafts with the edges of the rotors slidably contacting the respective inner peripheral walls of said housing, said crank shafts being arranged so as to rotate in the same direction at the same speed of rotation, the first and second rotary machine units acting as an internal combustion engine and as a compressor, respectively, the second unit having a compressed air feed port in communication with a fresh air charge port of the first unit, the exhaust from the first unit being introduced into the working chamber of the second unit to expand therein for the purpose of recovering the energy of the exhaust gases, said fresh air feed port and said fresh air charge port being arranged in a side cover of the engine, said separate inner walls defining respective first and second double-lobe chambers having a dividing wall therebetween, each chamber having a major and a minor axis, the major axis of said first chamber being angularly positioned relative to the major axis of said second chamber whereby one end of said first chamber major axis is relatively closely adjacent to said dividing wall and the other end of said chamber major axis is relatively remote from said dividing wall, said fresh air charge port being located substantially at said one end of said first chamber major axis on one side of said dividing wall and said fresh air feed port being located adjacent to the other side of said dividing wall in said second chamber.

4. A rotary type compound internal combustion engine including a first and a second rotary machine unit arranged on respective parallel longitudinal axes and comprised of a common housing having two separate inner peripheral walls of double-lobe approximately epitrochoidal, configuration, two crankshafts journaled in said housing for rotation in the same direction and at the same speed of rotation, and generally triangularly shaped rotors eccentrically mounted on the respective crank shafts for rotation about their respective own shafts at one-third the rotation speed of said crank shafts with the edges of said rotors slidably contacting the respective inner peripheral walls of said housing, the first rotary machine unit acting as an internal combustion engine and the second rotary machine unit acting as a compressor, the second unit having a compressed air feed port in communication with a fresh air charge port of the first unit, the exhaust from the first unit being introduced into the working chamber of the second unit to expand therein for the purpose of recovering the energy of the exhaust gases, said separate inner walls defining respective first and second double-lobe chambers having a dividing wall therebetween, each chamber having a major and a minor axis, the major axis of said first chamber being angularly positioned relative to the major axis of said second chamber whereby one end of said first chamber major axis is relatively closely adjacent to said dividing wall and the other end of said chamber major axis is relatively remote from said dividing wall, said fresh air charge port being located substantially at said one end of said first chamber major axis on one side of said dividing wall and said fresh air feed port being located adjacent to the other side of said dividing wall in said second chamber.

References Cited by the Examiner
UNITED STATES PATENTS

| | | | |
|---|---|---|---|
| 2,206,272 | 7/1940 | Toth | 60—15 |
| 2,812,748 | 11/1957 | Simonian. | |
| 2,993,482 | 7/1961 | Froede | 123—8 |
| 3,139,722 | 7/1964 | Yokoi | 60—15 |

SAMUEL LEVINE, *Primary Examiner.*

JULIUS E. WEST, *Examiner.*

N. E. ABRAMS, A. S. ROSEN, *Assistant Examiners.*